United States Patent
Zhong et al.

(10) Patent No.: US 9,957,671 B2
(45) Date of Patent: May 1, 2018

(54) LATEX CEMENT MORTAR POURED ANTI-RUTTING PAVEMENT STRUCTURE AND PAVING METHOD THEREOF

(71) Applicants: RESEACH INSTITUTE OF HIGHWAY MINISTRY OF TRANSPORT, Beijing (CN); CHONGQING CONSTRUCTION ENGINEERING GROUP CORPORATION LIMITED, Chongqing (CN)

(72) Inventors: Ke Zhong, Beijing (CN); Yifei Wu, Chongqing (CN); Sang Luo, Beijing (CN); Bo Chen, Chongqing (CN); Guoqiang Liu, Chongqing (CN); Xiaochen Ma, Beijing (CN); Jing Ding, Beijing (CN); Chengyong Hu, Beijing (CN); Guanghua Yue, Beijing (CN); Ronghua Chang, Beijing (CN)

(73) Assignees: RESEACH INSTITUTE OF HIGHWAY MINISTRY OF TRANSPORT, Beijing (CN); CHONGQING CONSTRUCTION ENGINEERING GROUP CORPORATION LIMITED, Chongqing (CN)

( * ) Notice: Subject to any disclaimer, the term of this patent is extended or adjusted under 35 U.S.C. 154(b) by 0 days. days.

(21) Appl. No.: 15/532,899

(22) PCT Filed: Jan. 19, 2017

(86) PCT No.: PCT/CN2017/071676
§ 371 (c)(1),
(2) Date: Jun. 2, 2017

(87) PCT Pub. No.: WO2017/125039
PCT Pub. Date: Jul. 27, 2017

(65) Prior Publication Data
US 2018/0044862 A1 Feb. 15, 2018

(30) Foreign Application Priority Data
Jan. 22, 2016 (CN) .......................... 2016 1 0045083

(51) Int. Cl.
*E01C 7/32* (2006.01)
*E01C 7/26* (2006.01)
(Continued)

(52) U.S. Cl.
CPC ................ *E01C 7/32* (2013.01); *C04B 14/06* (2013.01); *C04B 18/022* (2013.01);
(Continued)

(58) Field of Classification Search
CPC ......... E01C 7/32; E01C 7/26; C04B 24/2676; C04B 24/36; C04B 40/0032; C04B 18/022
See application file for complete search history.

(56) References Cited

U.S. PATENT DOCUMENTS 4,175,885 A * 11/1979 Jeppson .................... E01C 7/32
404/31
9,783,940 B2 * 10/2017 Luo ....................... E01D 19/125
(Continued)

FOREIGN PATENT DOCUMENTS

CN 101220574 A 7/2008
CN 104846714 A 8/2015
(Continued)

*Primary Examiner* — Abigail A Risic
(74) *Attorney, Agent, or Firm* — CBM Patent Consulting, LLC

(57) ABSTRACT

An anti-rutting pavement structure is arranged consecutively from bottom to top, a semi-rigid base layer, a SBS emulsified asphalt adhesive layer, a Type II latex cement mortar
(Continued)

poured asphalt concrete lower layer, a Type I latex cement mortar poured asphalt concrete middle layer and a high viscosity modified asphalt SMA-13 concrete surface layer.

7 Claims, 1 Drawing Sheet

(51) Int. Cl.
    *C04B 14/06*     (2006.01)
    *C04B 18/02*     (2006.01)
    *C04B 40/00*     (2006.01)
    *C04B 24/36*     (2006.01)
    *C04B 24/26*     (2006.01)

(52) U.S. Cl.
    CPC ............ *C04B 40/0032* (2013.01); *E01C 7/26* (2013.01); *C04B 24/2676* (2013.01); *C04B 24/36* (2013.01)

(56) References Cited

U.S. PATENT DOCUMENTS

| | | | | |
|---|---|---|---|---|
| 2003/0215286 | A1* | 11/2003 | Takamura | C08L 95/005 404/17 |
| 2008/0287570 | A1* | 11/2008 | Thayer | C04B 26/26 524/5 |
| 2010/0047015 | A1* | 2/2010 | Takamura | E01C 7/353 404/31 |
| 2011/0229262 | A1* | 9/2011 | Shibata | E01C 7/32 404/31 |
| 2015/0197896 | A1* | 7/2015 | Finke | E01C 7/185 404/71 |
| 2017/0204573 | A1* | 7/2017 | Luo | E01D 19/125 |

FOREIGN PATENT DOCUMENTS

| | | |
|---|---|---|
| CN | 204608539 U | 9/2015 |
| JP | 2003-147717 A | 5/2003 |
| JP | 2005-240441 A | 9/2005 |

* cited by examiner

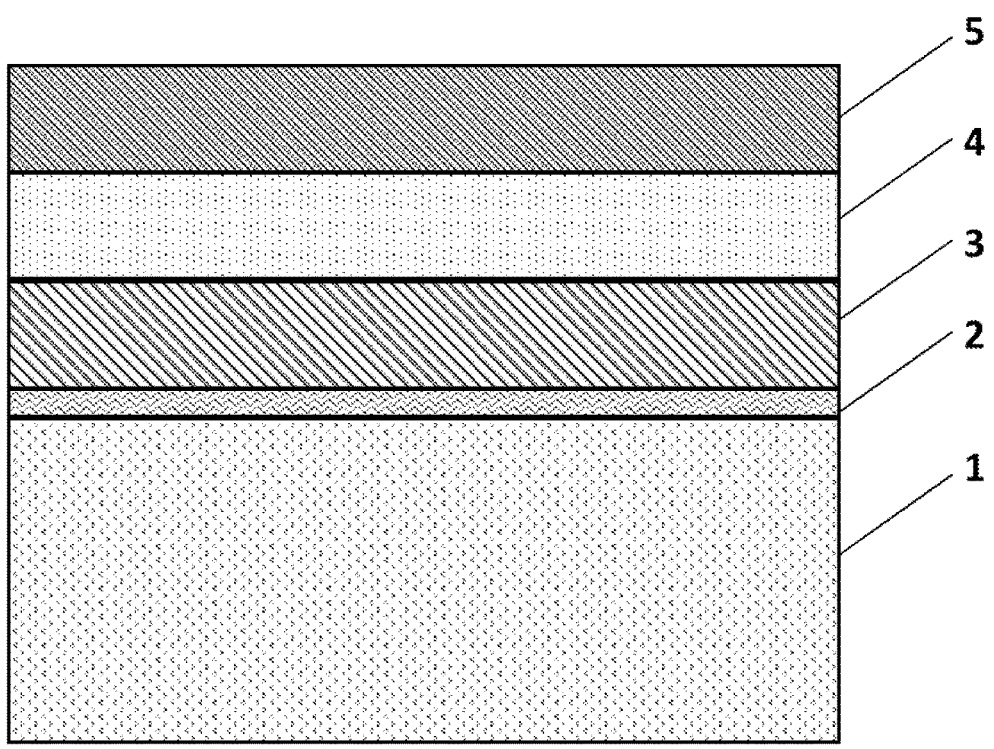

LATEX CEMENT MORTAR POURED ANTI-RUTTING PAVEMENT STRUCTURE AND PAVING METHOD THEREOF

This application is the U.S. national phase of International Application No. PCT/CN2017/071676 filed on 19 Jan. 2017 which designated the U.S. and claims priority to Chinese Application Nos. CN201610045083.5 filed on 22 Jan. 2016, the entire contents of each of which are hereby incorporated by reference.

TECHNICAL FIELD

The present invention belongs to the field of road engineering construction, in particular, to an anti-rutting pavement structure and paving method thereof.

BACKGROUND

In our country, the urban road pavement structure of highway is mainly asphalt pavement, which has a special characteristic of viscoelastic, causing both the properties of strength and flow to be affected by temperature. It brings in flat road surface, high driving comfort, low noise and small vibration, also, results in serious rut distress on the asphalt pavement structure due to repeated load of vehicle and the problem of surface cracking as an insufficient crack shrinkage or crack-resistance in low temperature of the semi-rigid base layer.

Though cement concrete pavement has the advantages of strong strength, good durability etc. and can effectively tackle the rutting problem, mud and dislocation are readily to emerge since its strong rigidity, complex arrangement of seam, high engineering cost, and inaccessibility for traffic during construction conservation, thus it cannot be preferably chosen as the anti-rutting pavement.

Observation and analysis on the rutting of asphalt pavement has been the focus of research at home and abroad. The early observations of rutting show that deformation is contributed mainly by the upper, middle layer, while the rutting occurs mainly on middle, lower layer in recent years and it occurs mainly at 5 cm below the road surface. However, this situation has not received due attention as a profound influence by the maximum shear stress theory. The maximum shear stress theory considers that the maximum shear stress in the middle layer is the main cause leading to rutting, and this rutting dominated by the middle, lower layer is perfectly matched with this theory. Tests show that the rut contribution rate (54.4%) of the semi-rigid base layer asphalt pavement lower layer is larger than that of the flexible pavement (26.6%), and it can be known that the rut contribution of the lower layer cannot be neglected under the circumstance of high temperature, heavy load and semi-rigid base layer. This is because that the very high temperature of the upper, middle layer during the heating process of the pavement leads to an naturally large lateral displacement, which will further aggravate plastic permanent deformation of the lower layer after yield; at the same time, it is naturally serious as the viscous flow of the structure layer and the higher temperature of the upper, middle layer; and the lower compressive stress of the lower layer naturally results in a small creep, rutting on the lower layer being mainly plastic deformation makes it have no recoverablility, causing a heavier damage.

According to the contradictory analysis of the philosophical thinking and the basic law of unity of opposites, it is required to invent a pavement structure, which combines the advantages of asphalt pavement and cement concrete pavement, has road flatness and sufficient bearing capacity, ensures an overall coordination of the pavement structure, overcomes shortcomings by learning from other's strong points, meets a good economic value and fast construction conservation period, and can be able to resist rutting deformation on the middle, lower layer against the conditions of semi-rigid base layer, high temperature, heavy load.

SUMMARY

The technical problem to be resolved by the present invention is to provide an anti-rutting pavement structure for solving the problem of inability to effectively resist rutting under high temperatures and heavy loads, weak ability of overall coordinate deformation and crack resistance.

Another technical problem to be solved by the present invention is to provide a paving method for above-mentioned anti-rutting pavement structure.

In order to solve the said technical problem, the present invention uses the following technical solutions:

An anti-rutting pavement structure comprises, arranged consecutively from bottom to top, a semi-rigid base layer, a SBS emulsified asphalt adhesive layer, a Type II latex cement mortar poured asphalt concrete lower layer, a Type I latex cement mortar poured asphalt concrete middle layer and a high viscosity modified asphalt SMA-13 concrete surface layer;

The Type II latex cement mortar poured asphalt concrete lower layer is composed of a macropore open-graded asphalt mixture and a latex cement mortar; wherein the mass ratio of the macropore open-graded asphalt mixture and the latex cement mortar is 5~7:1; the porosity of the macropore open-graded asphalt mixture is 25~35%, and it is formed by mixing an asphalt mixture with an aggregate smaller than 19 mm in a mass ratio of 4~8:100; the latex cement mortar is formed by mixing a latex modifier, cement, standard sand and water in a mass ratio of 6:100:20:60; wherein the latex cement mortar is impregnated into the macropore open-graded asphalt mixture through the pores of the macropore-opened asphalt mixture;

The Type I latex cement mortar poured asphalt concrete middle layer is composed of a macropore open-graded asphalt mixture and a latex cement mortar; wherein the mass ratio of the macropore open-graded asphalt mixture and the latex cement mortar is 5~7:1; the porosity of the macropore open-graded asphalt mixture is 25~35%, and it is formed by mixing an asphalt mixture with an aggregate smaller than 16 mm in a mass ratio of 4~8:100; the latex cement mortar is formed by mixing a latex modifier, cement, standard sand and water in a mass ratio of 6:100:20:60; wherein the latex cement mortar is impregnated into the macropore open-graded asphalt mixture through the pores of the macropore-opened asphalt mixture;

The high viscosity modified asphalt SMA-13 concrete surface layer is formed by mixing a high viscosity modified asphalt binder with an aggregate in a mass ratio of 5.5~6.5:100; wherein the high viscosity modified asphalt binder is composed of a Styrene-butadiene-styrene copolymer modified asphalt, a thermoplastic rubber, a bonding resin and a plasticizer, in a mass ratio of 100:10:2:1.

Wherein the spraying amount per unit area of the SBS emulsified asphalt adhesive layer is 0.5~0.8 kg/m$^2$.

Wherein the Type II latex cement mortar poured asphalt concrete lower layer has a thickness of 7~8 cm.

Wherein the Type I latex cement mortar poured asphalt concrete middle layer has a thickness of 5~6 cm.

Wherein the high viscosity modified asphalt SMA-13 concrete surface layer has a thickness of 4 cm.

Wherein the latex modifier is an acrylic ester copolymer.

Wherein the thermoplastic rubber includes a styrene-butadiene-styrene block copolymer, a styrene-isoprene-styrene block copolymer and a polyolefin elastomer.

Wherein the bonding resin includes polyethylene, linear low density polyethylene, polypropylene and polystyrene.

Wherein the plasticizer includes dimethyl phthalate, dioctyl phthalate and dipropylene glycol dibenzoate.

The above method for paving anti-rutting pavement structure is characterized in that it is formed by laying consecutively the SBS emulsified asphalt adhesive layer, the Type II latex cement mortar poured asphalt concrete lower layer of 7~8 cm, the Type I latex cement mortar poured asphalt concrete middle layer of 5~6 cm and the high viscosity modified asphalt SMA-13 concrete surface layer of 4 cm onto the semi-rigid base layer.

Each raw material involved in the present invention needs to meet the requirements in Table 1~5.

TABLE 1

Technical requirements for the high viscosity modified asphalt SMA-13 concrete binder

| technical index | technical requirement | text method |
|---|---|---|
| penetration (25° C., 5 s) (0.1 mm) | ≥40 | JTJ 052-2000 |
| softening point (R&B) (° C.) | ≥70 | |
| ductility (25° C., 5 cm/min) (cm) | ≥50 | |
| flash point (° C.) | ≥260 | |
| viscosity (60° C.) (Pa · s) | ≥200,000 | |

TABLE 2

Technical requirements of binder for pouring asphalt concrete

| technical index | technical requirement | text method |
|---|---|---|
| penetration (25° C., 5 s) (0.1 mm) | 30~60 | JTJ 052-2000 |
| softening point (R&B) (° C.) | ≥70 | |
| ductility (25° C., 5 cm/min) (cm) | ≥100 | |
| solubility (trichlorethylene) (%) | ≥99.0 | |
| flash point (° C.) | ≥300 | |
| density (25° C.) (g · cm$^{-3}$) | ≥1.00 | |

TABLE 3

Technical requirements of latex cement

| technical index | technical requirement | text method |
|---|---|---|
| solid content (%) | ≥40 | GB 175-2007 |
| viscosity (20° C., MPa · s) | ≥20000 | |
| PH value | 4~6 | |
| particle size (μm) | ≤0.5 | |
| dry compressive shear strength (MPa) | ≥10 | |

TABLE 4

Technical requirements for SBS emulsified asphalt adhesive layer

| test item | requirement | text method |
|---|---|---|
| residue on 1.18 mm sieve (%) | ≤0.1 | JTJ 052-2000 |
| storage stability (5 d, %) | ≤5 | |
| viscosity (C$_{25.3}$, s) | 8~25 | |
| evaporation residue content | ≥55 | |
| evaporation penetration (25° C., 0.1 mm) | 40~100 | |

TABLE 4-continued

Technical requirements for SBS emulsified asphalt adhesive layer

| test item | | requirement | text method |
|---|---|---|---|
| residue property | Ductility (5° C., cm) | ≥20 | |
| | softening point (° C.) | ≥55 | |

TABLE 5

Grading requirements for high viscosity modified asphalt SMA-13 concrete, poured asphalt concrete, cement mortar mineral

| pavement material sieve size (mm) | high viscosity modified asphalt SMA-13 concrete | Type I poured asphalt concrete | Type II poured asphalt concrete | cement mortar |
|---|---|---|---|---|
| | Sieve passing rate | | | |
| 26.5 | 100 | 100 | 100 | 100 |
| 19 | 100 | 100 | 90~100 (95) | 100 |
| 16 | 100 | 95~100 | 80~90 | 100 |
| 13.2 | 90~100 | 90~95 | 45~60 (54) | 100 |
| 9.5 | 50~75 | 80~85 (83.5) | 30~40 (36) | 100 |
| 4.75 | 20~34 | 28~35 (32.5) | 15~25 (20) | 100 |
| 2.36 | 15~26 | 10~18 (12.5) | 12~20 (15) | 100 |
| 1.18 | 14~24 | 4~15 (5) | 8~15 (10) | 100 |
| 0.6 | 12~20 | 3~10 (5) | 6~10 (7) | 90~100 |
| 0.3 | 10~16 | 3~8 (4) | 3~10 (5) | — |
| 0.15 | 9~15 | 3~6 (3) | 3~8 (4) | — |
| 0.075 | 8~12 | 1~5 (1.5) | 1~5 (2) | 10~20 |

Beneficial Effects

The present invention achieves an anti-rutting pavement structure with poured asphalt mixture, which employs the pavement structure type of "a high viscosity modified asphalt SMA-13 concrete surface layer+a Type I latex cement mortar poured asphalt concrete middle layer+a Type II latex cement mortar poured asphalt concrete lower layer+a SBS emulsified asphalt adhesive layer", wherein the high viscosity modified asphalt SMA-13 concrete layer is a skeleton dense structure, which can provide a good roughness to ensure functional requirements for the upper layer of road surface; the latex cement mortar poured asphalt concrete of middle, lower layer forms a first main skeleton structure by squeezing effect in a form of open grade aggregate, and forms a second skeleton structure by pouring the latex cement mortar to condensation and be hardened, forming a uniform, dense, close structural layer material, having a high strength and performance of anti-rutting and capable of resisting severe rut deformation of middle, lower layer due to the conditions of high temperatures, heavy loads and semi-rigid base layer; the SBS emulsified asphalt adhesive layer being located between the semi-rigid base layer and lower layer ensures coordinate deformation of overall structure, serving to protect the pavement structure layer.

Compared with prior art, the present invention has improved great contributions of the middle and lower layer of the semi-rigid base layer pavement for rutting under high temperature and heavy load condition, while the pavement having a good crack-resistance, improvement for coordination of the overall deformation of the surface layer and the base layer, and a short construction conservation period, short time before traffic opening, excellent economic performance.

BRIEF DESCRIPTION OF THE DRAWINGS

FIG. 1 is a structure schematic diagram of the invention.

DETAILED DESCRIPTION

The embodiments of the present invention consider that (1) the main shear force of the pavement structure under the condition of semi-rigid base layer increases first and then decreases with the increasing depth under the driving load, and the peek value occurs in the middle, lower layer of pavement. The insufficient shear resistance of the middle, lower layer of pavement under high temperature may cause an irreversible accumulation of plastic deformation under vehicle load, forming pavement rutting distress; (2) regarding that the pavement surface layer needs to meet more of structural requirement than functional requirement, i.e. the cracks in the pavement are as little as possible and shrinkage and expansion joints needs not to be arranged, meanwhile meeting the requirement of crack-resistance under lower temperature and ensuring comfort and safety of the vehicle driving to the utmost; (3) regarding that the pavement structure has a general thickness of 18~20 cm, normally the thickness of the middle layer is 5~6 cm and that of the lower layer is 7~8 cm. Standard Specification for Construction and Acceptance of Highway Asphalt Pavement (JTGF40-2004) shows that for hot mixing paste asphalt mixture, the compressed thickness of one asphalt layer should not be smaller than 2.5~3 times maximum nominal particle size of the aggregate. Meanwhile according to the relative regulation of the minimum compactness and suitable thickness for the asphalt mixture structural layer in Table 4.1.3 of Standard Specification for Construction and Acceptance of Highway Asphalt Pavement (JTGD50-2006), the maximum normal particle size of the Type II latex cement mortar poured asphalt concrete is 19 mm, and its suitable thickness is 60~80 mm, therefore it can only be used in the lower layer instead of the upper layer of 40 mm and middle layer of 50 mm, otherwise the structure doesn't meet the design specifications. The maximum normal particle size of the Type I latex cement mortar poured asphalt concrete is 16 mm, and its suitable thickness is 40~60 mm, therefore it can only be used in the middle or upper layer instead of lower of 80 mm, otherwise the structure doesn't meet the design specifications.

Based on above considerations, the Embodiment 1 of the present invention provides a paving method for anti-rutting pavement structure, which meets above factors in terms of the following angles: (1) the lower layer in the pavement structure utilizes the latex cement mortar poured asphalt mixture which resists rutting, meeting the structural requirements of pavement; (2) the surface layer utilizes the high viscosity modified asphalt SMA-13 concrete, meeting the functional requirements of pavement; (3) the middle layer of pavement utilizes the Type I latex cement mortar poured asphalt concrete, of which the aggregate has a maximum normal particle size of 16 mm, and the lower layer utilizes the Type II latex cement mortar poured asphalt concrete, of which the aggregate has a maximum normal particle size of 19 mm. This scheme is embodied specifically as in FIG. 1.

At the same time, Example 2 of the present invention compares different pavement structures with the semi-rigid base layer to compare the crack resistance and tensile and performance of resisting rutting of each pavement structure.

In the following embodiments,

The utilized latex modifier is ZBR-608 emulsion produced from Zhengbang Chemical, Co., Ltd, Yunnan.

The utilized thermoplastic rubber is styrene-butadiene-styrene block copolymer;

The utilized adhesive resin is polyethylene;

The utilized plasticizer is dioctyl phthalate.

Embodiment 1

As shown in FIG. 1, the anti-rutting pavement structure is arranged consecutively from bottom to top with the semi-rigid base layer, the SBS emulsified asphalt adhesive layer, the Type II latex cement mortar poured asphalt concrete layer, the Type I latex cement mortar poured asphalt concrete layer and the high viscosity modified asphalt SMA-13 concrete layer.

Wherein the spraying amount of the semi-rigid base layer and the SBS emulsified asphalt adhesive layer is 0.6 kg/m$^2$, the Type II latex cement mortar poured asphalt concrete layer has a thickness of 8 cm, the Type I latex cement mortar poured asphalt concrete layer has a thickness of 5 cm, the high viscosity modified asphalt SMA-13 concrete layer has a thickness of 4 cm.

The Type II latex cement mortar poured asphalt concrete material layer is composed of a macropore open-graded asphalt mixture and a latex cement mortar in a mass ratio of 6:1; wherein the macropore open-graded asphalt mixture is formed by mixing a asphalt mixture with an aggregate smaller than 19 mm in a mass ratio of 5:100, and the porosity of the macropore open-graded asphalt mixture is 30%; the latex cement mortar is composed of a latex modifier, cement, standard sand and water in a mixing ratio of 7:100:25:65; the latex cement mortar is impregnated into the macropore open-graded asphalt mixture through the pores with the porosity of 30% of the macropore-opened asphalt mixture.

The Type I latex cement mortar poured asphalt concrete material layer is composed of a macropore open-graded asphalt mixture and a latex cement mortar in a mass ratio of 6:1; wherein the macropore open-graded asphalt mixture is formed by mixing a asphalt mixture with an aggregate smaller than 16 mm in a mass ratio of 6:100, and the porosity of the macropore open-graded asphalt mixture is 25%; the latex cement mortar is composed of a latex modifier, cement, standard sand and water in a mixing ratio of 6:100:20:60; the latex cement mortar is impregnated into the macropore open-graded asphalt mixture through the pores with the porosity of 25% of the macropore-opened asphalt mixture;

The high viscosity modified asphalt SMA-13 concrete is mixed by a bonding material with an aggregate in a mass ratio of 6.0:100; wherein the high viscosity modified asphalt binder is composed of a Styrene-butadiene-styrene copolymer modified asphalt, a thermoplastic rubber, a bonding resin and a plasticizer, in a mixing ratio of 100:10:2:1;

In the anti-rutting pavement paving structure of the present embodiment, each technical index meets the structural requirements for use, the test results are specially shown in Table 6 as below:

TABLE 6

Test results

| No. | Item | index test value | technical requirement |
|---|---|---|---|
| 1 | Marshall strength | 40.6 kN (Type I latex cement mortar poured asphalt concrete) 52.3 kN (Type II latex cement mortar poured asphalt concrete) | ≥30 kN |
| 2 | dynamic stability | 21540 times/mm (70° C., composite structure *) | ≥6000 times/mm |
| 3 | low temperature bending strain | 5.2 × 10$^{-3}$ (−15° C., composite structure) | ≥3.0 × 10$^{-3}$ |

Among them, the composite structure: the test specimen used in the process is a structural form of "high viscosity modified asphalt SMA-13 concrete+Type I latex cement mortar poured asphalt concrete+Type II latex cement mortar poured asphalt concrete" based an equal thickness proportion with the anti-rutting pavement paving structure of the present invention.

Embodiment 2

In this comparative example, the pavement structure is arranged consecutively from bottom to top with the semi-rigid base layer, SBS emulsified asphalt adhesive layer, lower layer, middle layer, surface layer.

Wherein the spraying amount of the semi-rigid base layer and the SBS emulsified asphalt adhesive layer is 0.6 kg/m$^2$, the lower layer has a thickness of 8 cm, the middle layer has a thickness of 5 cm, the surface layer has a thickness of 4 cm.

According to the relative regulation of the minimum compactness and suitable thickness for the asphalt mixture structural layer in Table 4.1.3 of *Standard Specification for Construction and Acceptance of Highway Asphalt Pavement* (JTGD50-2006), the maximum normal particle size of the Type II latex cement mortar poured asphalt concrete is 19 mm, and its suitable thickness is 60~80 mm, therefore it can only be used in the lower layer instead of the upper layer of 40 mm and middle layer of 50 mm, otherwise the structure doesn't meet the design specifications. The maximum normal particle size of the Type I latex cement mortar poured asphalt concrete is 16 mm, and its suitable thickness is 40-60 mm, therefore it can only be used in the middle or upper layer instead of lower of 80 mm, or otherwise the structure doesn't meet the design specifications. According to the relationship between the maximum normal particle size and suitable pavement thickness of above mixture, the comparative example includes:

Structure 1 of "high viscosity modified asphalt SMA-13 concrete surface layer+Type I latex cement mortar poured asphalt concrete middle layer+Type II latex cement mortar poured asphalt concrete lower layer".

Structure 2 of "Type I latex cement mortar poured asphalt concrete upper layer+Type I latex cement mortar poured asphalt concrete middle layer+Type II latex cement mortar poured asphalt concrete lower layer".

Wherein the Type II latex cement mortar poured asphalt concrete material layer is composed of a macropore open-graded asphalt mixture and a latex cement mortar in a mass ratio of 6:1; wherein the macropore open-graded asphalt mixture is formed by mixing an asphalt mixture with an aggregate smaller than 19 mm in a mass ratio of 5:100, and the porosity of the macropore open-graded asphalt mixture is 30%; the latex cement mortar is composed of a latex modifier, cement, standard sand and water; the latex cement mortar is impregnated into the macropore open-graded asphalt mixture through the pores with the porosity of 30% of the macropore-opened asphalt mixture.

The Type I latex cement mortar poured asphalt concrete material layer is composed of a macropore open-graded asphalt mixture and a latex cement mortar in a mass ratio of 6:1; wherein the macropore open-graded asphalt mixture is formed by mixing a asphalt mixture with an aggregate smaller than 16 mm in a mass ratio of 6:100, and the porosity of the macropore open-graded asphalt mixture is 25%; the latex cement mortar is composed of a latex modifier, cement, standard sand and water in a mixing ratio of 6:100:20:60; the latex cement mortar is impregnated into the macropore open-graded asphalt mixture through the pores with the porosity of 25% of the macropore-opened asphalt mixture;

The high viscosity modified asphalt SMA-13 concrete is mixed by a bonding material with an aggregate in a mass ratio of 6.0:100; wherein the high viscosity modified asphalt binder is composed of a Styrene-butadiene-styrene copolymer modified asphalt, a thermoplastic rubber, a bonding resin and a plasticizer, in a mixing ratio of 100:10:2:1;

In the anti-rutting pavement paving structure of the present embodiment, each technical index meets the structural requirements for use, the results of comparative test are specially shown in Table 7 as below:

TABLE 7

Results of comparative test

| pavement structure | dynamic stability | low temperature bending strain |
|---|---|---|
| Structure 1 (SMA + I + II) | 21540 | 5.2 × 10$^{-3}$ |
| Structure 2 (I + I + II) | 23452 | 1.9 × 10$^{-3}$ (does not meet the technical requirement) |
| technical requirement | ≥6000 times/mm | ≥3.0 × 10$^{-3}$ |

It can be seen from the specific implementation provided by above embodiments of the present invention that the new paving process employed by the embodiments of the present invention takes both the structural and functional requirement for the pavement into account. Under the condition of semi-rigid base layer, the latex cement mortar poured asphalt concrete employed by the middle, lower layer can resist effectively the formation of rutting, and the high viscosity modified asphalt SMA-13 concrete ensures effectively the pavement resistance to tensile and cracking. At the same time, the joint utilization of Type I and Type II latex cement mortar poured asphalt concrete materials can be suitable for the requirement for the maximum normal particle size of the road with different layer thickness, can allow the pavement to have a better compactness, thereby enhancing the high temperature stability, low temperature crack-resistance and usability, and so it has a larger application prospect for newly-built roads and reconstructed and expanded roads.

What is claimed is:

1. An anti-rutting pavement structure, characterized in that it comprises, arranged consecutively from bottom to top, a semi-rigid base layer (1), a SBS emulsified asphalt adhesive layer (2), a Type II latex cement mortar poured asphalt concrete lower layer (3), a Type I latex cement mortar poured asphalt concrete middle layer (4) and a high viscosity modified asphalt SMA-13 concrete surface layer (5);

the Type II latex cement mortar poured asphalt concrete lower layer (3) is composed of a macropore open-graded asphalt mixture and a latex cement mortar; wherein the mass ratio of the macropore open-graded asphalt mixture and the latex cement mortar is 5~7:1; the porosity of the macropore open-graded asphalt mixture is 25~35%, and it is formed by mixing an asphalt mixture with an aggregate smaller than 19 mm in a mass ratio of 4~8: 100; the latex cement mortar is formed by mixing a latex modifier, cement, standard sand and water in a mass ratio of 7:100:25:65; wherein the latex cement mortar is impregnated into the macropore open-graded asphalt mixture through the pores of the macropore-opened asphalt mixture;

the Type I latex cement mortar poured asphalt concrete middle layer (4) is composed of a macropore open-graded asphalt mixture and a latex cement mortar; wherein the mass ratio of the macropore open-graded asphalt mixture and the latex cement mortar is 5~7:1; the porosity of the macropore open-graded asphalt mixture is 25~35%, and it is formed by mixing an asphalt mixture with an aggregate smaller than 16 mm in a mass ratio of 4~8: 100; the latex cement mortar is formed by mixing a latex modifier, cement, standard sand and water in a mass ratio of 6:100:20:60; wherein the latex cement mortar is impregnated into the macropore open-graded asphalt mixture through the pores of the macropore-opened asphalt mixture;

the high viscosity modified asphalt SMA-13 concrete surface layer (5) is formed by mixing a high viscosity modified asphalt binder with an aggregate in a mass ratio of 5.5~6.5: 100; wherein the high viscosity modified asphalt binder is composed of a Styrene-butadiene-styrene copolymer modified asphalt, a thermoplastic rubber, a bonding resin and a plasticizer, in a mass ratio of 100: 10: 2: 1.

2. The anti-rutting pavement structure according to claim 1, characterized in that the spraying amount per unit area of the SBS emulsified asphalt adhesive layer (2) is 0.5~0.8kg/m².

3. The anti-rutting pavement structure according to claim 1, characterized in that the Type II latex cement mortar poured asphalt concrete lower layer (3) has a thickness of 7~8 cm.

4. The anti-rutting pavement structure according to claim 1, characterized in that the Type I latex cement mortar poured asphalt concrete middle layer (4) has a thickness of 5~6 cm.

5. The anti-rutting pavement structure according to claim 1, characterized in that the high viscosity modified asphalt SMA-13 concrete surface layer (5) has a thickness of 4 cm.

6. The anti-rutting pavement structure according to claim 1, characterized in that the latex modifier is an acrylic ester copolymer.

7. A method of paving for an anti-rutting pavement structure according to claim 1, characterized in that it is formed by laying consecutively the SBS emulsified asphalt adhesive layer (2), the Type II latex cement mortar poured asphalt concrete lower layer (3) of 7~8 cm, the Type I latex cement mortar poured asphalt concrete middle layer (4) of 5~6 cm and the high viscosity modified asphalt SMA-13 concrete surface layer (5) of 4 cm onto the semi-rigid base layer (1).

* * * * *